United States Patent [19]

McClintock

[11] Patent Number: 5,598,208
[45] Date of Patent: Jan. 28, 1997

[54] VIDEO VIEWING AND RECORDING SYSTEM

[75] Inventor: Shawn L. McClintock, Upper Saddle River, N.J.

[73] Assignees: Sony Corporation, Japan; Sony Corporation of America

[21] Appl. No.: 312,189

[22] Filed: Sep. 26, 1994

[51] Int. Cl.$^6$ .................................................. H04N 7/18
[52] U.S. Cl. ............................ 348/159; 348/8; 348/157; 348/705; 386/118
[58] Field of Search ................................ 348/8, 10, 157, 348/159, 705, 734; 358/310, 335; H04N 7/18

[56] References Cited

U.S. PATENT DOCUMENTS

| | | |
|---|---|---|
| 3,217,098 | 11/1965 | Oswald ................................. 348/157 |
| 3,984,625 | 10/1976 | Camras . |
| 4,097,893 | 6/1978 | Camras . |
| 4,227,259 | 10/1980 | Mogi . |
| 4,394,691 | 7/1983 | Amano et al. . |
| 4,519,002 | 5/1985 | Amano . |
| 4,527,204 | 7/1985 | Kozakai et al. . |
| 4,598,287 | 7/1986 | Osakabe et al. . |
| 4,620,229 | 10/1986 | Amano et al. . |
| 4,746,983 | 5/1988 | Hakamada . |
| 4,751,581 | 6/1988 | Ishiguro et al. . |
| 4,807,052 | 2/1989 | Amano . |
| 4,817,203 | 3/1989 | Tsurumoto et al. . |
| 4,821,102 | 4/1989 | Ichikawa et al. . |
| 4,862,269 | 8/1989 | Sonoda et al. . |
| 4,916,530 | 4/1990 | Neilson et al. . |
| 4,916,532 | 4/1990 | Streck et al. . |
| 4,992,866 | 2/1991 | Morgan ................................. 348/159 |
| 5,062,010 | 10/1991 | Saito . |
| 5,073,823 | 12/1991 | Yamada et al. . |
| 5,193,208 | 3/1993 | Yokota et al. . |
| 5,210,603 | 5/1993 | Sabin ................................. 348/157 |
| 5,264,929 | 11/1993 | Yamaguchi ........................... 348/159 |
| 5,264,935 | 11/1993 | Nakajima . |
| 5,325,202 | 6/1994 | Washino ............................... 348/222 |
| 5,508,737 | 4/1996 | Lang ................................... 348/159 |

*Primary Examiner*—Howard W. Britton
*Attorney, Agent, or Firm*—Ronald P. Kananen

[57] ABSTRACT

Disclosed is a video recording system which permits one to participate in a recording of an event utilizing predetermined views in a manner which ensures security of the participant's video recording equipment. The system includes several cameras arranged in a recording area to provide images from several views. The images are provided to the user's own equipment which is secured within locked compartments. According to another aspect, there is disclosed a video recording system which permits "real time" editing of recorded events so as to customize a recording made using the several cameras. According to still another aspect of the invention, the user interfaces with a central viewstation, selecting desired views, either prerecorded or live broadcasts, to be recorded on either the user's own equipment or equipment provided to the user at the event site.

17 Claims, 12 Drawing Sheets

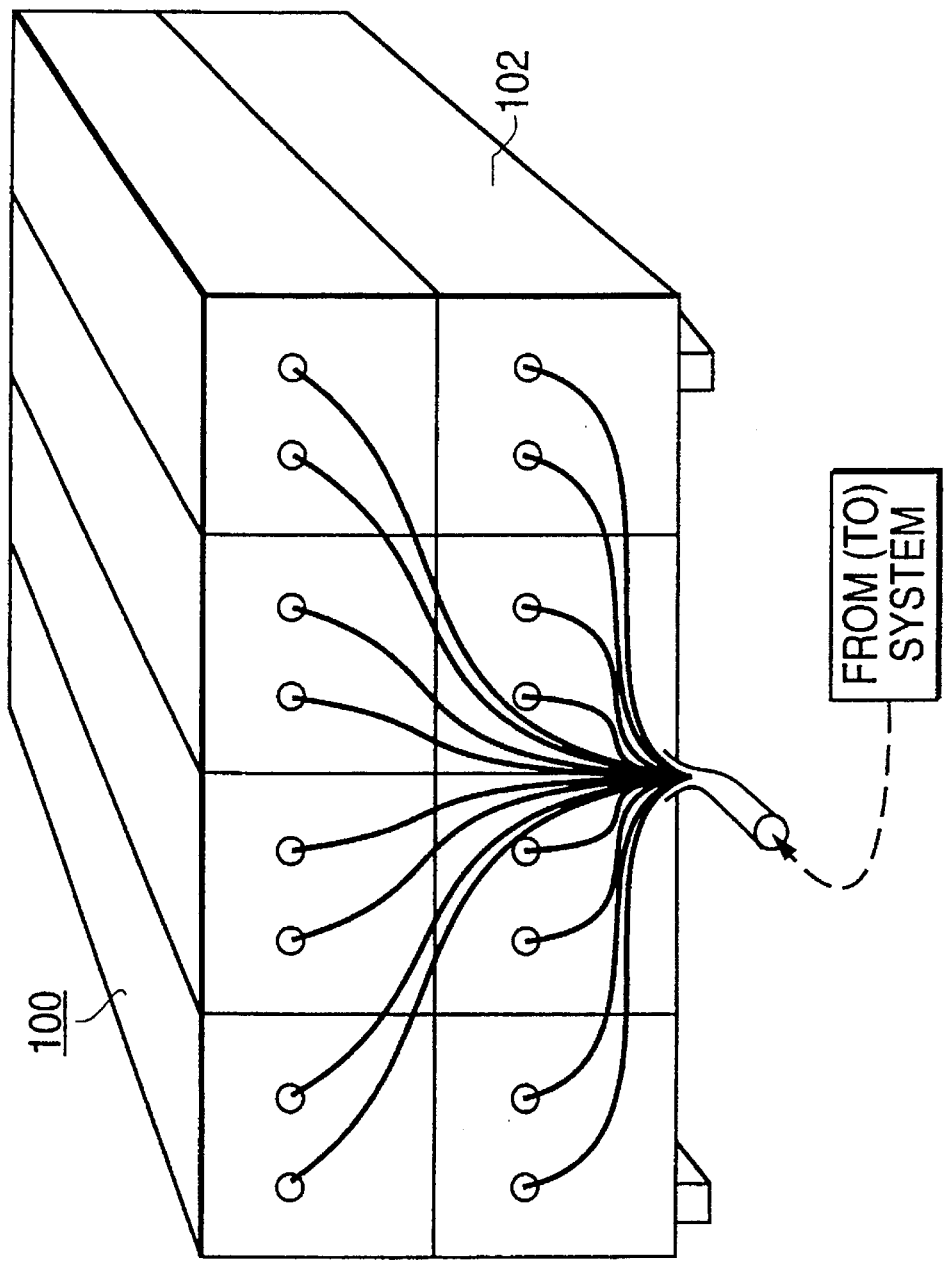

VIDEO VIEWING AND RECORDING SYSTEM

CROSS REFERENCE TO RELATED APPLICATION

Reference is made to application Ser No. 08/267,891, filed Jul. 6, 1994 and entitled "Remote Video and Recording System for Remotely Occurring Events," now U.S. Pat. No. 5,508,737.

BACKGROUND OF THE INVENTION

The present invention is directed to a video system for remotely viewing and recording predetermined views of an event, and of participants in the event, in a predetermined sequence. More particularly, the video recording and reproducing system according to the invention is directed to a system which permits visitors to, or observers at, an amusement park, sporting event, carnival, or the like, to record predetermined views of the event and participants therein, from a remote location, in a predetermined sequence as produced by a plurality of video cameras positioned at predetermined locations at the event. Still more particularly, this invention relates to a system for remotely viewing and video recording an event and person of interest at a location remote from either the event or the person.

The invention further relates to a video recording system which permits one to participate in a recording of an event utilizing predetermined views in a manner which ensures security of the participant's video recording equipment. It also relates to a video recording system to edit recorded events so as to customize a recording made using the predetermined views.

BRIEF DESCRIPTION OF RELEVANT ART

When visiting public locations or public events, such as carnivals, amusement parks, sporting events or the like, it is often desirable to record the occasion through use of photographic or video recording media. Thus, it is common for visitors to such public locations and events to bring photographic or video recording equipment with them for the purpose of recording specific activities during the occasion of such a visit. In the usual practice, the visitor selects a desired vantage point at the event and takes those pictures or makes such video recordings as are of interest to the visitor.

However, it is often difficult, or even impossible, to capture views of a popular event because of the press of many visitors seeking commonly desirable locations which might be regarded as particularly worthy of serving as a recording site. Thus, stability of viewing during the picture taking or video recording activity may be interrupted, especially during exciting times at the event. In addition, desirable views may occur at locations far away from the photographic or video recording equipment, or from the operator of such equipment, so that meaningful, desirable, or closeup views cannot be captured at a precise time of interest to the visitor. Further, many activities may take place within confines which may not be generally accessible or otherwise viewable by the operator of the photographic or video equipment, or in which such recording is prohibited because of proscriptions against recording without license from a performer or relating to the performance.

For example, in the case of an amusement ride, such as a roller coaster, extraneous items such as cameras and video recorders may not be permitted on the ride for various reasons, such as safety. An operator of the photographic or video equipment may not actually be a participant in the event but rather only an observer, and therefore might be positioned at a general observation location from which it is not possible to obtain optimum and interesting views of participants or riders. Thus, video or photographic recordings made by observers or participants in these events may not include views or scenes of the more highly desirable features of the event and event participants. As a specific example, a parent of a younger child might wish to record the child's ride on a circus animal, such as an elephant, for example; however, the remoteness of ground level locations away from the path of the elephant's ride precludes closeup shots of the child's enthusiastic reactions.

A fixed photographic system is apparently known to the art. It is understood that the Anaconda roller coaster of the Kings Dominion amusement park near Richmond, Virginia utilizes fixed cameras and makes available for purchase fixed location photographs of customers for direct purchase at the end of a roller coaster ride.

Aside from the above difficulties in the process of having video or photographic equipment at an event such as an amusement park, sporting event, or the like, at least some time and effort is required to ensure that the photographic or video equipment is safe and secure during the public event. Thus, it would be desirable to make video recordings at a convenient and secure location.

Related to this consideration is the concern that recordings made according to the prior art are not necessarily "customized" according to the user's likings. For example, if one merely asked another to record him or her in a particular scene, there is the risk that the person asked will not record the scene in the particular manner desired. There is the further risk in such a 10 situation that the person asked might harm or even steal one's equipment.

In a different aspect, activities of performers or portions of performances are often not available except through a purchase or rental of licensed video recordings. But, such recordings lack the spontaneity and realism of the event which the viewer attended personally. Thus, it is also sometimes desirable to permit portions of public performances, which were heretofore restricted, available for recording on a "live" basis, whether in whole or in part, according to appropriate licensing fees for the performer or performance. It is also desirable that the owner or operator of recording equipment be able to be recorded joining in or otherwise participating in the performance. For example, one might wish to be recorded at an event such as a concert or sporting event.

These and other difficulties are apparent when considering problems faced by a viewer in obtaining satisfactory recordings under the circumstances at public events or locations as described.

SUMMARY OF THE INVENTION

Therefore, it is an overall object of this invention to provide a video recording system having video cameras remotely located along the venue of an event for providing video images at a viewing station where a user can record those images with the user's own television equipment, such as a personal video camera. It is a related object of the invention to permit the user to participate in the event and to be recorded doing so. It is an additional object to ensure that the user's recording equipment is kept secure during the user's visit to the venue.

Another object of the invention is to permit the user to "edit" images recorded at such a venue so as to select desired scenes and omit undesired ones. Still another object of the invention is to provide a system in which the user can edit scenes of an event being displayed in "real time" in order to obtain a customized recording of the event.

Directed to achieving the foregoing objects and aims of the invention, a video recording system comprises a plurality of video cameras positioned at predetermined locations at a predefined event occurrence area for capturing video images of activities occurring within a predetermined view of the event occurrence area and providing a video signal thereof, control means for providing video selection signals indicating which of the video signals is desired to be viewed, means for selectively routing video signals from the plurality of video cameras based on the video selection signals, and a securing unit having at least one compartment for holding video recording equipment, the compartment including video terminals for providing the video signal routed by the means for selectively routing.

According to another aspect of the invention, one can only access the securing unit by payment of a fee. According to another aspect of the invention, there is an event viewing and recording system including a plurality of cameras providing different views of a particular event. Video signals from these cameras are provided via switching and interface means to one or more viewers. Using a video recording unit, each user selects from among the views and records the selected images, thereby obtaining a customized recording.

According to still another aspect of the invention, there is disclosed a video recording system comprising, a plurality of video cameras as above, a plurality of video recorders, each recording and re-displaying a captured image based on a video signal supplied from a corresponding one of the plurality of video cameras, a plurality of video monitors positioned at a central observation viewstation, each of the video monitors selectively displaying an image from one of the plurality of video cameras or from one of the plurality of video recorders, at least one video output terminal positioned at the central observation viewstation for providing a video signal corresponding to an image displayed on one of the video monitors, control means for selectively routing video signals based on the video images to at least one video output terminal, and at least one user controlled video recording units coupled to said at least one video output terminal. According to this embodiment, the video recording units include means coupled to the control means for selecting the video signal to be provided to the video output terminal based on the images displayed on the video monitors.

BRIEF DESCRIPTION OF THE DRAWINGS

In the drawings:

FIG. 6C is a rear perspective view of a recording equipment securing unit as shown in FIG. 6A or 6B.

DESCRIPTION OF THE INVENTION

The following description is presented in the context of an event such as an amusement park ride; however, it will be recognized that the present invention could be equally well utilized at other events such as carnivals, sporting events, or the like.

Figure 1:
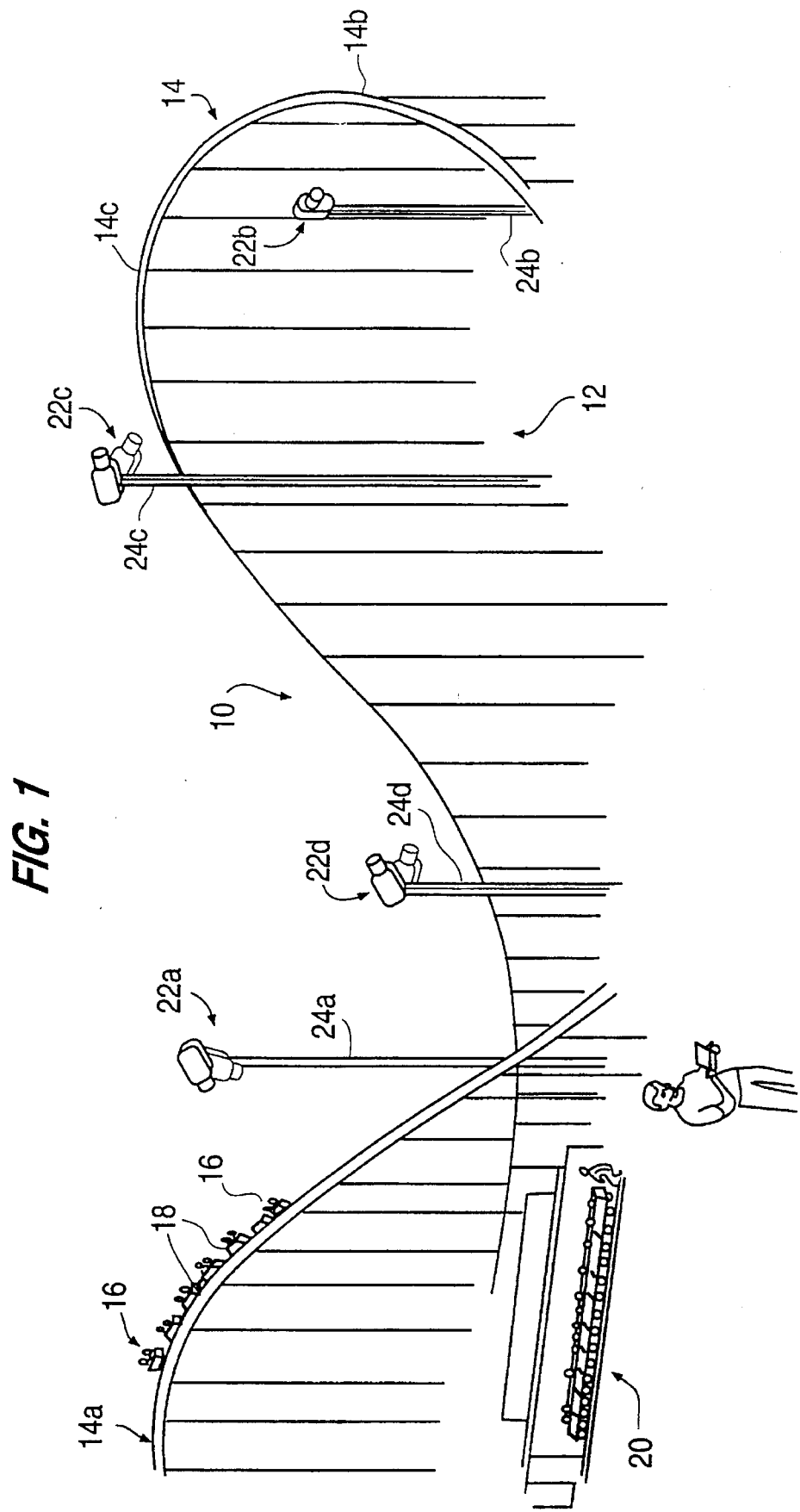
FIG. 1 is a representative sketch of a portion of a roller coaster ride at an amusement park, having a plurality of fixed video camera locations at which the video cameras are fixed or have variable viewing features, according to the invention.

In FIG. 1, an amusement ride such as a roller coaster is shown generally by a reference numeral 10. As is well known, the roller coaster 10 includes a physical structure 12 for supporting a roller coaster rail 14 (i.e., a monorail, birail, or the like) arranged in a serpentine, undulating pattern of rises, falls, and curves to provide thrilling sensations to riders 16 in a plurality of connected roller coaster cars 18. An access area to the ride where customers can await their turn to ride the roller coaster is shown generally at the reference numeral 20.

A plurality of video cameras 22, four of which are representatively shown by the reference numerals 22a, 22b, 22c, and 22d, are fixedly mounted on corresponding mounting structures 24a to 24d at spaced, selected locations along the path of the cars 18 of the roller coaster 10. The focus of each of the cameras 22 may be fixed or adjustable, and the positioning of each of the cameras 22a to 22d may be fixed or adjustable, as shown in the phantom outline for each of the cameras 22. Thus, a camera 22a, for example, may be fixed to view riders 16 in cars 18 at a top level of the track 14 where customers are expectantly awaiting the thrill of the forthcoming descent along the rail 14a. Alternatively, the camera 22a can be programmed to zoom in on the faces of the riders 16, and/or programmed to pivot (i.e. to pan or tilt) to maintain the riders 16 in focus for a prolonged period of time compared to a fixed camera position. If desired, at least one video camera could be placed on the lead roller coaster car 18, for example, and its output provided by wireless link to a monitoring location in a manner similar to cameras mounted on racing cars.

Similarly, the video camera 22b is positioned to view the riders at an ascending portion of the roller coaster at a path position along the rail 14b spaced from the camera 22a. Representatively, the video camera 22c is positioned at the top of the roller coaster path, spaced at a path position along the rail 14c spaced from the camera 22b. In addition, the camera 22d is fixed downstream from the camera 22c to view the descent along the rail 14d. A greater number of cameras can also be used.

The cameras 22a to 22d can be arranged to produce continuous signals for individual monitoring, or programmed to operate in conjunction with the passage of the roller coaster cars, thus to provide a progressive sequence of video images for recording. Such programming can be responsive to the time at which the cars will pass the fixed camera locations according to the experience with the particular roller coaster at which the cameras are used. Alternatively, a wireless interface between the cars of the roller coaster and the video cameras could also be used to activate the cameras in a sequential manner. Such wireless links are known to the art as are representatively shown by U.S. Pat. Nos. 3,984,625, 4,097,893, and 4,916,530, which are incorporated by reference. In the alternative, a microprocessor controlled system could be used to pan, tilt and zoom the respective cameras 22a to 22d to follow the action of the cars and to shift the resulting video display from one camera view to the next as the ride on the roller coaster progresses.

The position of the cars 18 of the roller coaster could also be sensed in a number of ways. For example, sensors located at track level could be used to sense the position of the cars 18 and could thus provide an input to a selected camera for recording, or to a microprocessor as a sensor input to control the recording process. Alternatively, the cars 18 could be equipped with wireless transmitters for beaming a signal to an interceptor for controlling the operation of a selected camera, or for providing an input to a microprocessor as a sensor input to control the recording process. Other types of sensors could be used as well.

Figure 2:
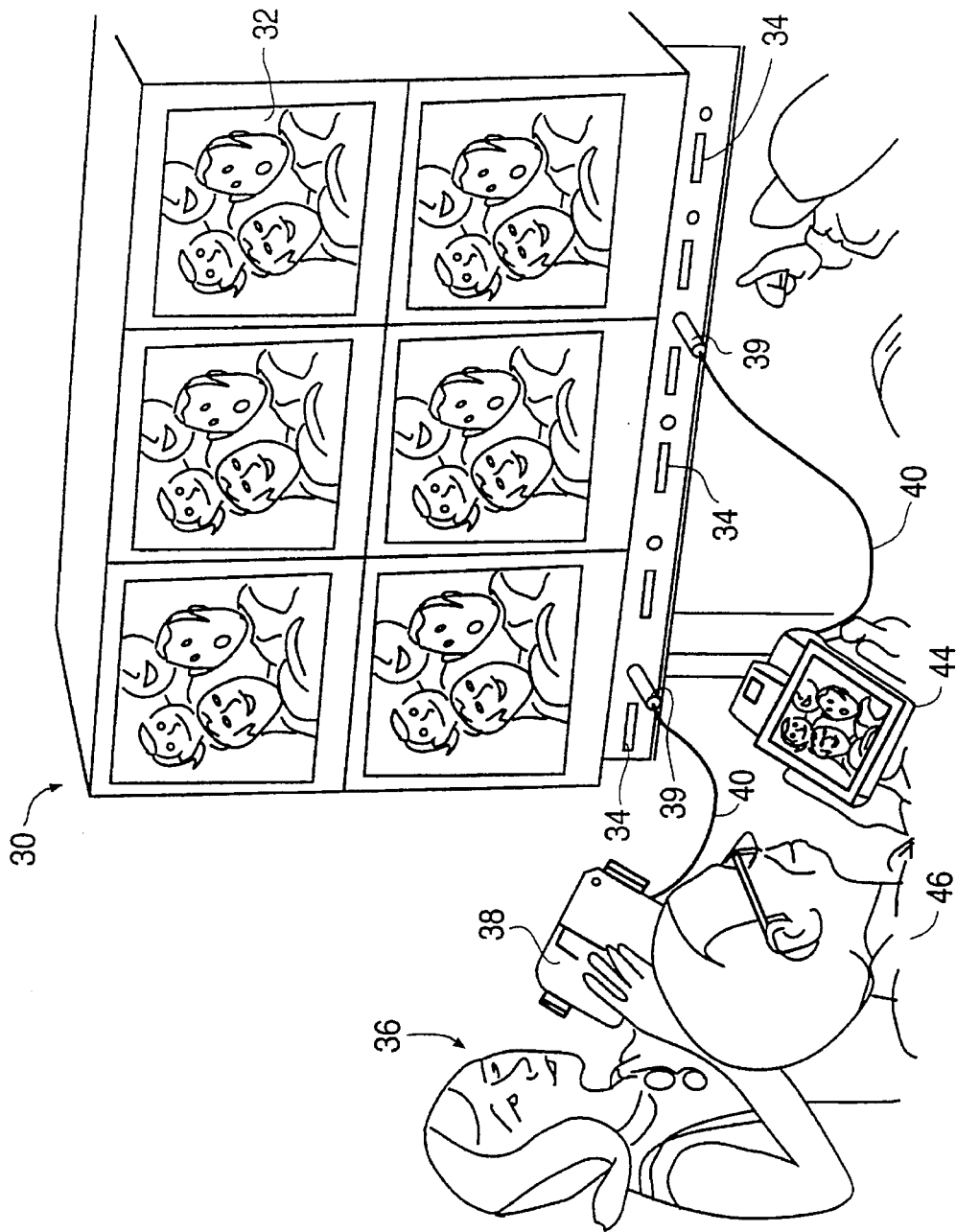
FIG. 2 is a representative perspective view of a plurality of video monitors at a central viewstation showing closeups of riders in one of the roller coaster cars of FIG. 1, and further illustrating persons who are video recording the images of those closeups on the video monitors.

FIG. 2 shows a viewstation 30 having a plurality of video monitors designated generally by the reference numeral 32, each showing the selected sequential output of the video cameras 22a to 22d of FIG. 1. A plurality of video jacks 34 are provided so that a user 36 can connect a personal video camera 38 to the jack 34 by a connector 39 on a cable 40 and record the output of the video camera system of FIG. 1 on the personal video camera 38. The security of the recording step could be implemented to require a payment by the user for the service, or as payment of a license fee, where a licensable performance is involved. Specially constructed jacks 34 could also be used with restricted connectors 40 to ensure that only authorized persons are able to avail themselves of this service as described.

In addition to providing a recorded video image for recording on a personal video camera, the video image can be provided to a Watchman brand or Video Walkman-type of product 44 in a "local area narrowcast" application. Such a video image could then supplement current events being viewed on the video, such as on a "picture in a picture" basis.

Figure 3:
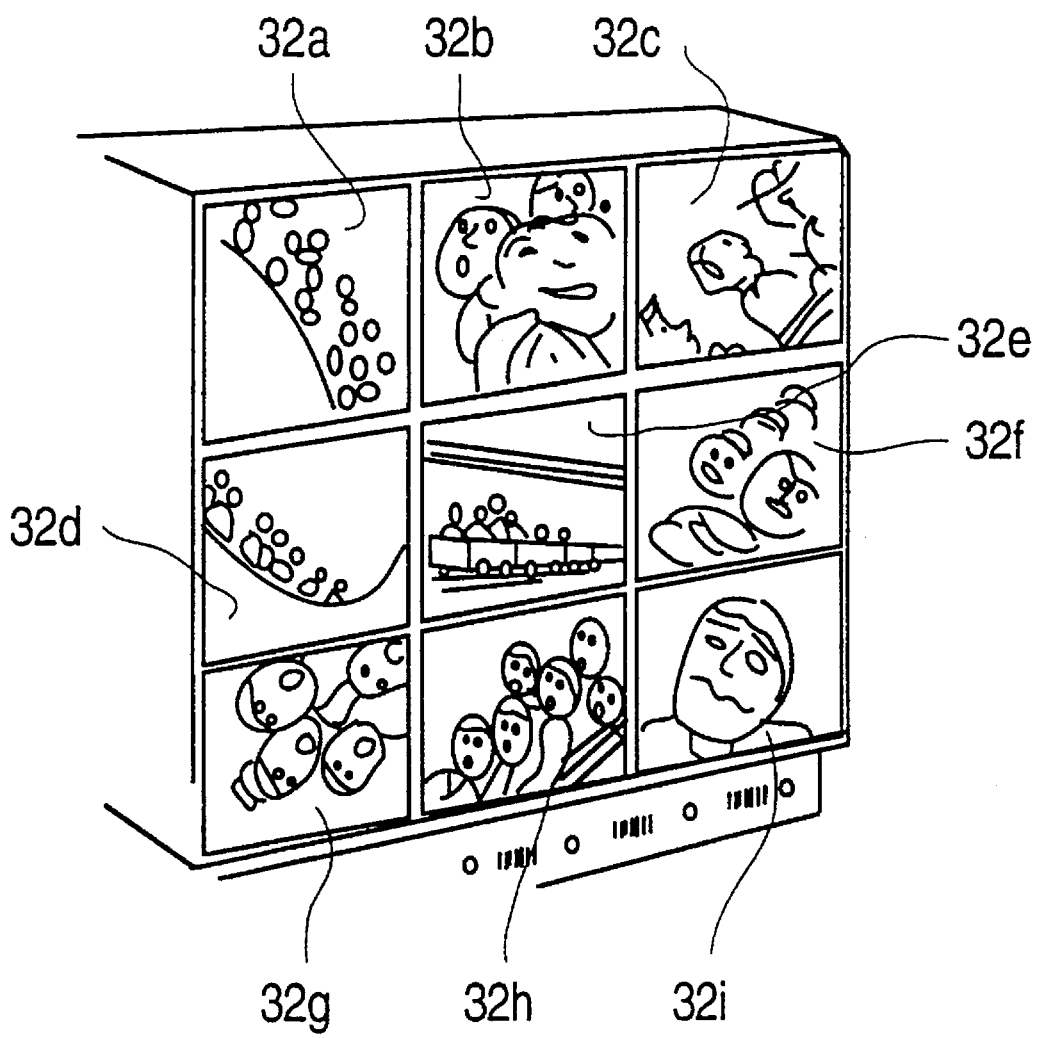
FIG. 3 is a representative diagram of a plurality of images generated by the plurality of cameras located along the path of the roller coaster of FIG. 1.

FIG. 3 shows an alternative view of the video monitors 32a to 32i wherein a different image is displayed on each of the monitors respectively. Such an output arrangement is shown diagrammatically in FIG. 4 wherein a plurality of video monitors 32a to 32n are respectively connected to a like plurality of video cameras 22a to 22n. A controller 45 is provided with suitable conduits 47 to respectively control the pan, tilt and zoom motions of the respective video cameras 22a to 22d in a manner which is well known in the art using servo motors and suitable servo control techniques. The line breaks generally shown at reference numeral 46 illustrate that signals from the respective cameras in the system may be hardwired or transmitted, according to techniques known in the art.

The image displayed at the video monitors 32a to 32n could also be selected manually by an operator. As shown, however, the user can select which view he or she wishes to follow and record that particular view, such as upon notice from an operator.

Figure 4:
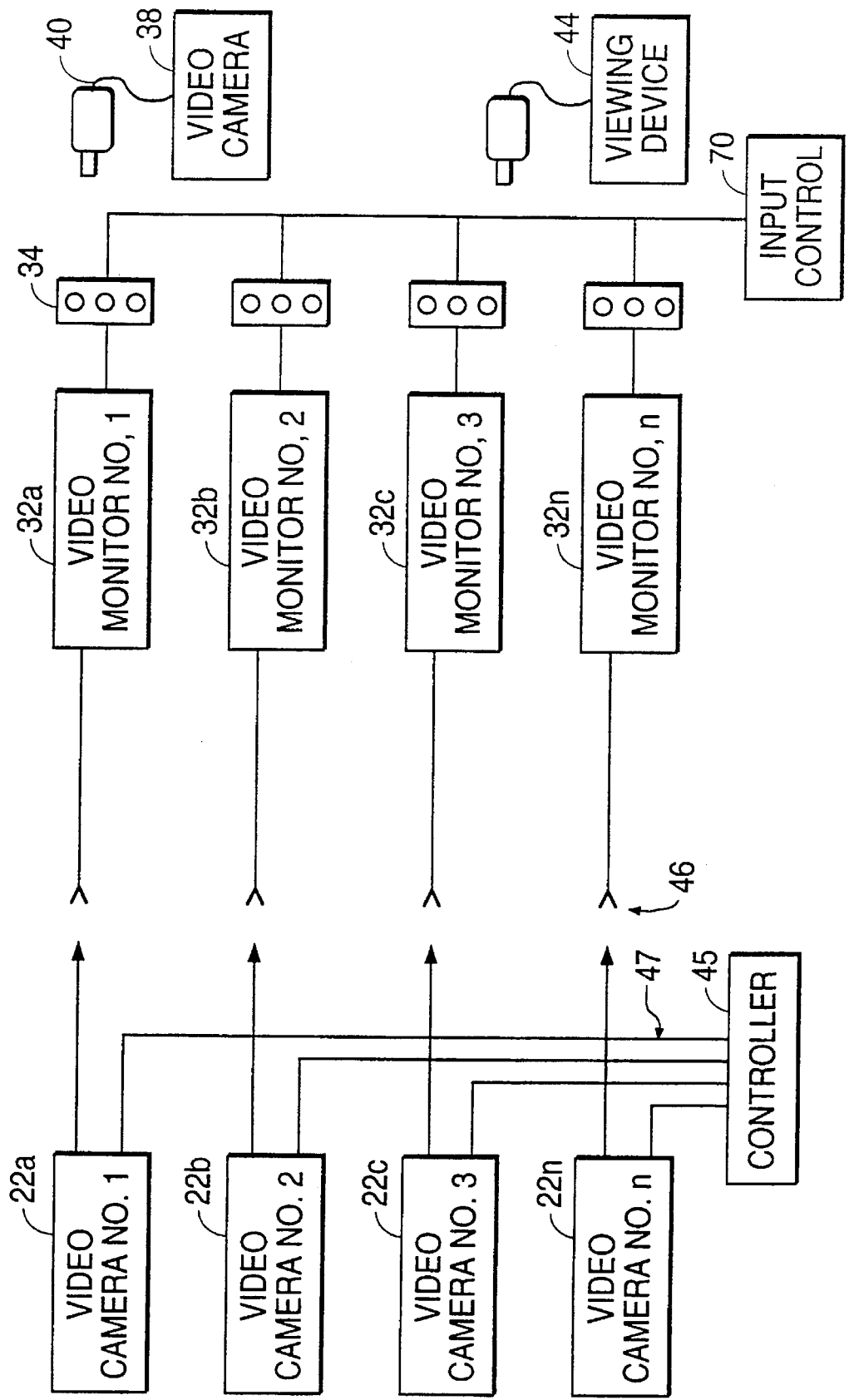
FIG. 4 is a simplified diagram of a plurality of video cameras providing a plurality of video images at centrally-located video monitors for selective recording by users.
Figure 5:
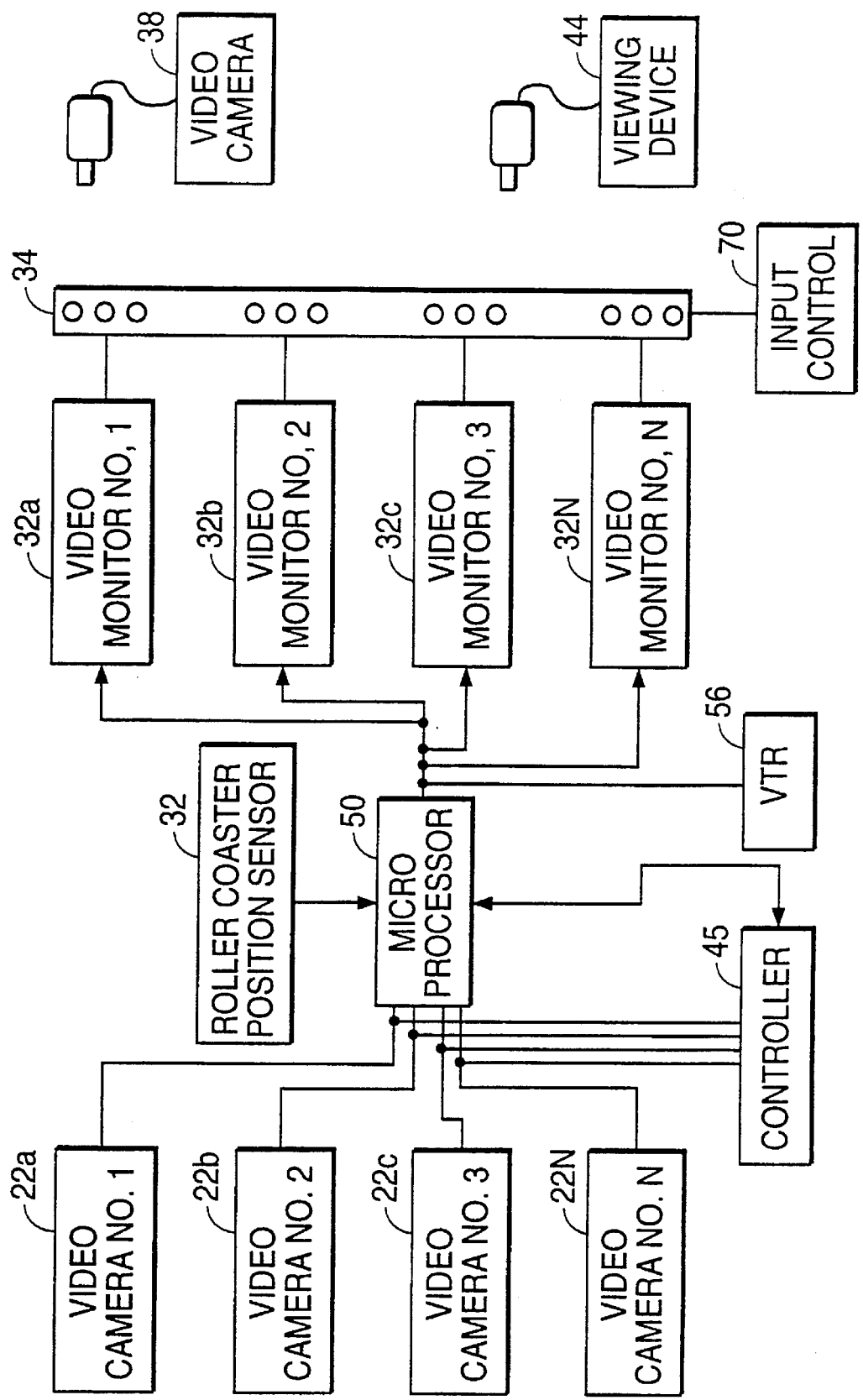
FIG. 5 is a block diagram of microprocessor controlled system for producing a controlled sequence of images at centrally-located video monitors and a video recording of such images.

FIG. 5 shows a representative system for displaying a single selected monitored video image on a plurality of video monitors for recording by a number of users. The controller 45, as in FIG. 4, controls the pan, tilt and zoom features of the video cameras 22, but in cooperation with a microprocessor 50 which controls the video sequencing and recording operations of each of the respective video cameras as a function of time or position of the roller coaster 10 to display the selected video image on the video monitors 32a to 32n to be viewed or recorded by individuals as discussed in connection with FIG. 2. The microprocessor 50 could be connected to a roller coaster sensor 52 to initiate certain recording events, as described above.

An input control device 70, shown in FIGS. 4 and 5, limits recording to authorized persons, such as those having amusement park tickets for such, or for a fee. Thus, the input control device could be a simple coin operated switch, a magnetic card reader, or a keypad for inhibiting or prohibiting use of the jacks for recording or viewing the video images at the central location based on images generated from a remote location.

Individual video tapes of a particular ride could also be made available to a customer in the event that a customer chooses to ride along in one of the cars of the roller coaster. In that case, a personal video tape could be provided as made at the central viewstation by a video tape recorder (VTR) 56. In that case, a user could purchase a tape showing the event, while also having an opportunity to participate in the event.

Modifications to the above described video recording system in accordance with the present invention are now described with reference to FIGS. 6 to 12.

Figure 6A:
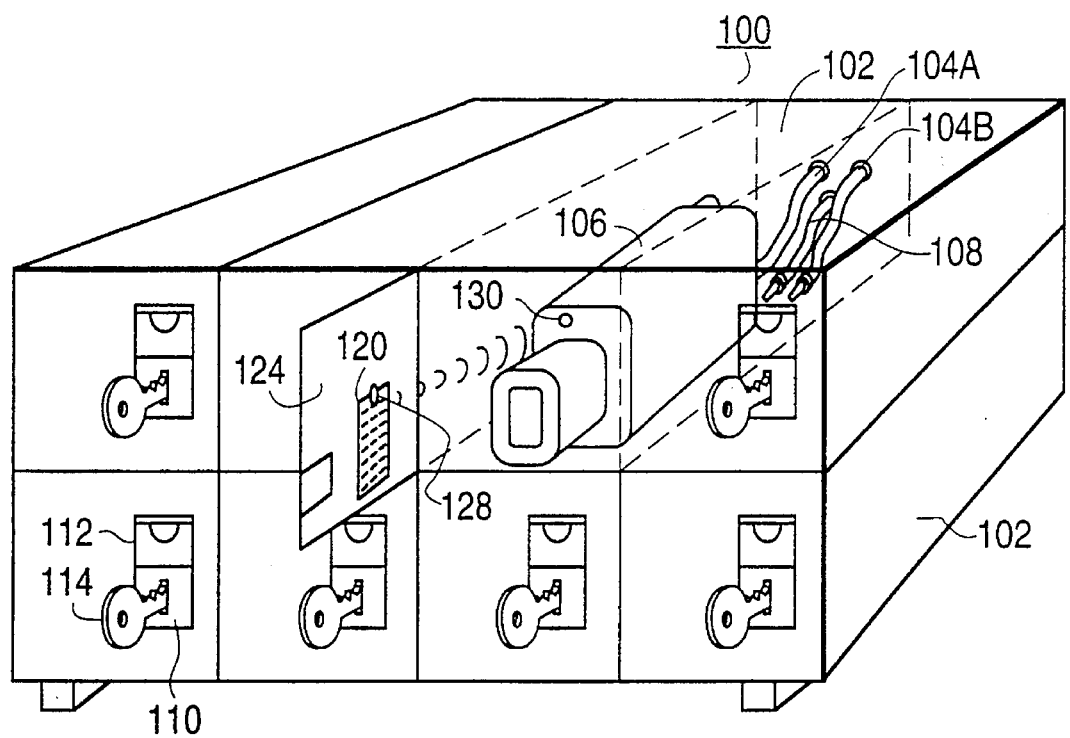
FIG. 6A is a front perspective view of a recording equipment securing unit according to a first embodiment of the present invention in which a conventional key is used to access and lock the securing unit.

As a variation of the systems described above, a modified video recording system utilizes an equipment securing unit 100 shown in FIG. 6A. This unit 100 essentially comprises a plurality of lockable compartments 102. Each such compartment includes terminals 104A and 104B, usually both video and audio, by which the user can interface with a centralized system. According to this embodiment, if the operator wants to use his or her own equipment to interface with jacks/camera access, the user would open the door to a compartment, place the user's own recording equipment 106 in the compartment, and connect it with the system. The user then secures the compartment, and leaves to participate in whichever events are desired to be recorded.

Optionally, the compartments could each be provided with power terminals 108 in addition to the terminals used to interface with the system. Such power terminals could be adapted to common recording devices or be a standard AC terminal from which power could be supplied to the user's own adaptor.

According to a preferred embodiment, each compartment 102 is accessible only when and if some form of payment is made by the user. In the example shown in FIG. 6A, a conventional key lock 110 such as commonly found in bus and railroad stations is employed. According to this embodiment, the user would be required to insert coins into a coin receiving slot 112 in order to remove the key 114 and lock the equipment in the compartment. When the user desires to leave the event venue, for example, when an amusement park closes, the user would open the compartment and remove the equipment, leaving the key until the fee amount is paid.

Figure 6B:
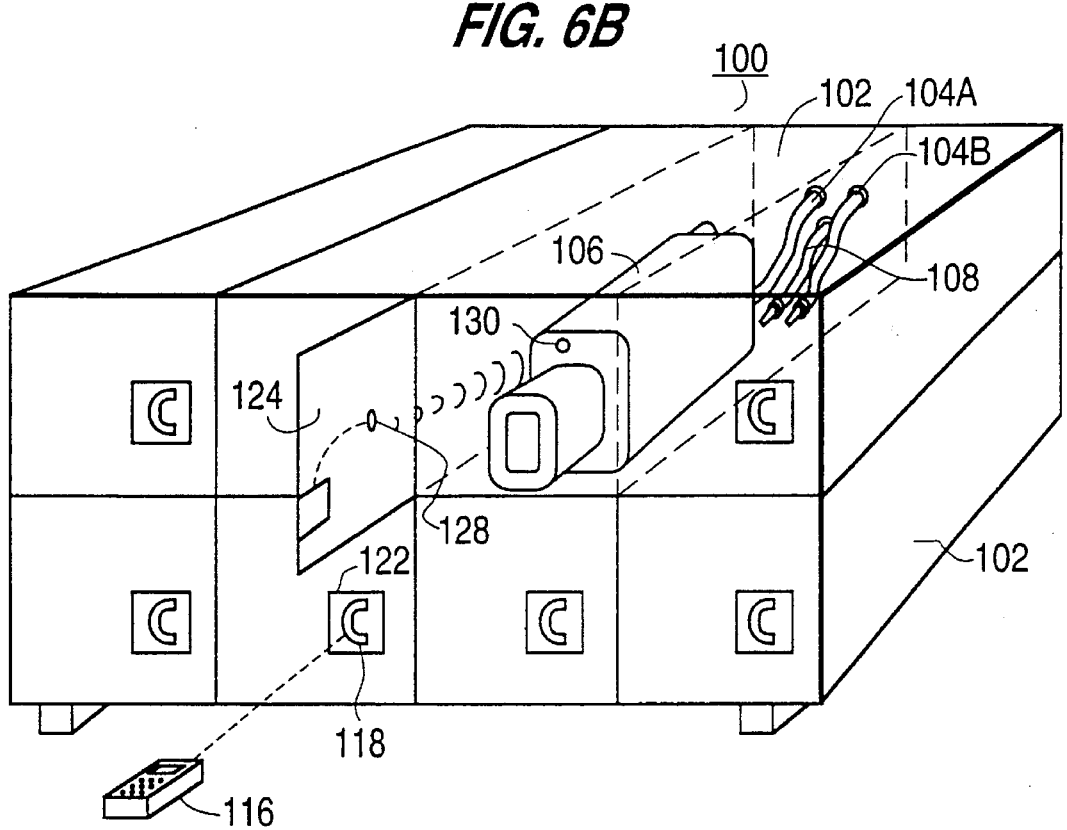
FIG. 6B is a front perspective view of an alternative recording equipment securing unit according to the first embodiment of the present invention in which a remote control device is used to access and lock the securing unit.

FIG. 6B illustrates an alternative embodiment in which the conventional key entry shown in FIG. 6A is replaced with a remote controlled entry. According to this embodiment, the user would obtain, preferably on a rental basis, a remote control device 116 from the proprietors of the event venue. This device would include circuitry, well known in the art, such as infrared transmission means which interacts with infrared receiving means located near a handle member 122 on the door 124 of the compartment to be accessed. In this way, the user could repeatedly access his or her equipment.

Both variations of the securing unit include means for interfacing with the video system described above.

FIG. 6C shows a rear view of the securing unit 100 in which the cables from each of the compartments lead out from the securing unit and are coupled with a system described below with reference to FIG. 7. Thus, according to the example described above, one could place one's own camera into a compartment, connect it to the system with the video and audio terminals, lock the compartment, then join one's children in riding the roller coaster. One would then "signal" the recording unit when the action to be recorded commences. Predetermined views would then be sent to the camera in the manner described above. For example, switching between views might occur as the movement of a roller coaster car through the ride is sensed by various sensors. In this way, a user's whole family will be recorded together.

It will be appreciated by those skilled in the art that by utilizing either the embodiment of FIG. 6A or of FIG. 6B, it is unnecessary to rely on special terminals or jacks as previously mentioned above in order to limit use to authorized users, since each user would pay in order to gain access to the system.

The interface between the user's equipment and the system can include one or more different components known in the art. For example, this system could incorporate a control or programming means 120 (FIG. 6A) located within the securing unit compartment which would interface, for example, with a microprocessor controlled system via a cable connector. Such a control or programming means could comprise an alpha-numeric keypad. Using this interface, the user could "tell" the system which predetermined views are to be used, or which ride to be filmed. For example, the user could be supplied with a code index which informs the user of a unique identification code for each ride. The user would then enter the appropriate code and join in the action. According to this variation, the programming means 120 would preferably include a transmitter device 128 (such as an infrared LED) to provide signals to the user's equipment which indicate when recording is to begin. Such a transmitter can be used to control recording equipment such as a camcorder according to techniques known in the art, as representatively shown by U.S. Pat. Nos. 4,527,204 and 5,062,010, the disclosure of which are hereby incorporated by reference. Specifically the camcorder to be controlled would have a receiving means 130 which receive the signals from the transmitting device 128.

Once a ride is identified, a timer (within the system) may be set to wait a predetermined amount of time sufficient to permit the user to join the event. Once this time elapses, the programming means 120 sends a record signal to the user's equipment. Different views are then recorded. Once it is detected that the ride is over, the programming means 120 then sends a stop signal to the user's equipment with the transmitter device.

Alternatively, the remote control 116 which regulates access to each compartment as shown in FIG. 6A could also function as such a control of programming means. According to this embodiment, the remote control 116 interfaces via wireless transmission with sensors 210a and 210b (as shown in FIG. 7) which are coupled to a video system at various locations throughout the event venue. The user would key in which ride is to be recorded and key in a start record command and a stop record command with the remote control 116. Each compartment would contain a transmitter 128 by which such record and stop signals are sent to the recording equipment 106 in the securing unit compartment as described above.

It will be apparent that many other alternative embodiments of this interface are possible in accordance with the invention. For example, each car on a ride to be recorded might be provided with a keypad by which the user could interface with his recording equipment. Alternatively, each user might control his equipment with a magnetic card reader coupled to a suitably programmed system.

Figure 7:
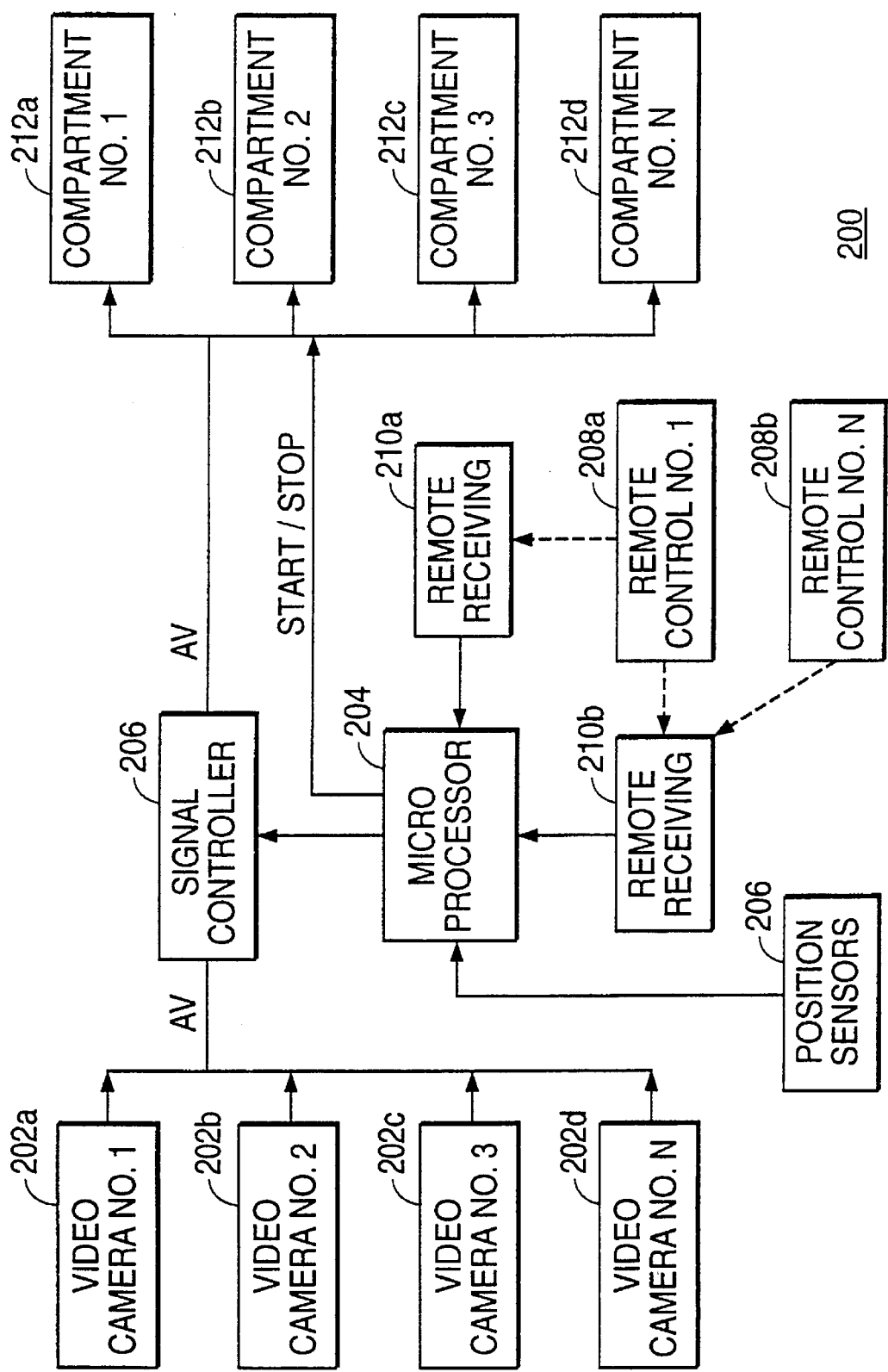
FIG. 7 is a block diagram showing a video recording system according to the first embodiment of the invention including a plurality of securing units wherein the user interfaces with the system via wireless transmission.

FIG. 7 is a block diagram which illustrates such a microprocessor controlled system 200 according to the second embodiment of the invention. As shown, the system includes n video cameras 202a to 202d which each provide video and audio signals to a microprocessor 204. Additionally, positional sensors 206 may be coupled to the system as explained above. According to this example, information is provided to the microprocessor from one or more of the wireless remotes 208a, 208b via signal detectors 210a, 210b. In response to the signals received from a remote control device, the microprocessor 204 determines via signal controller 206 which of the video and audio signals which are received from the video cameras are coupled to the terminals located in the compartments 212a to 212d that contains users' equipment. According to this example, each remote control device which corresponds to a particular compartment would be configured to output an identifying signal to indicate to the system which compartment is to receive the desired video and audio signals.

According to such an embodiment, one could access a compartment, connect one's own video recorder to the system with the terminals provided therein, and lock the compartment. One could then communicate with the system via the remote control and appropriately located sensors to instruct the microprocessor control as to which view to provide to the camera interface and/or when to activate and deactivate recording the equipment in the compartments. Several different sensors could be located at different positions in order to ensure reliable transmission.

Figure 8:
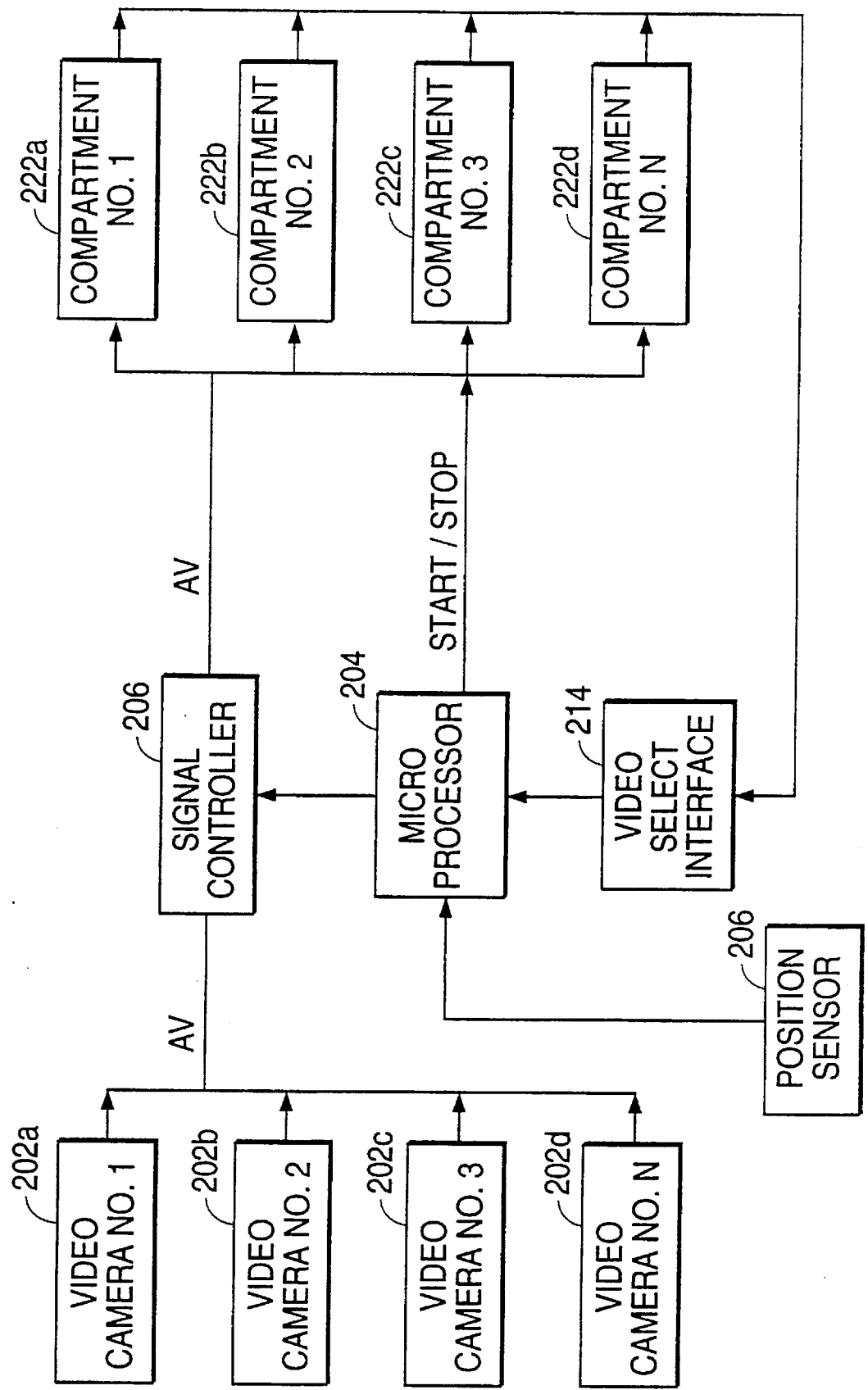
FIG. 8 is a block diagram showing a video recording system including a plurality of securing units wherein the user interfaces with the system via transmission from the securing units by wire.

Alternatively, as depicted in FIG. 8, the recording instructions are provided to the microprocessor 204 by video select interface 214. This interface could include a keypad located on or near the ride or a keypad in the securing unit as shown in FIG. 6A. The record start and stop commonly are provided to compartments 222a to 222d as discussed above. The microprocessor could be programmed to implement a delay as instructed by the user through the keypad, as mentioned above.

With such a system, one could instruct the microprocessor 204 to provide the view from camera one which might be directed towards the line of people waiting for the roller coaster. One could then instruct the system to switch to camera number 2, which might be a wide angle view of the entire ride. One could cut to a view from a third camera positioned on the roller coaster car.

The use of remote signalling, either by wire or over air, eliminates the need for special lines per car, or problems with last minute changes in event circumstances. That is, one could simply key in instructions or change preprogrammed instructions remotely, rather than having to go back to the equipment and changing the program. Such remote signalling is well suited for use with a centralized recording system where users take camcorder equipment at the beginning of an event or "rent" equipment from the facility and pay for access to all camera views of the event/facility.

Figure 9:
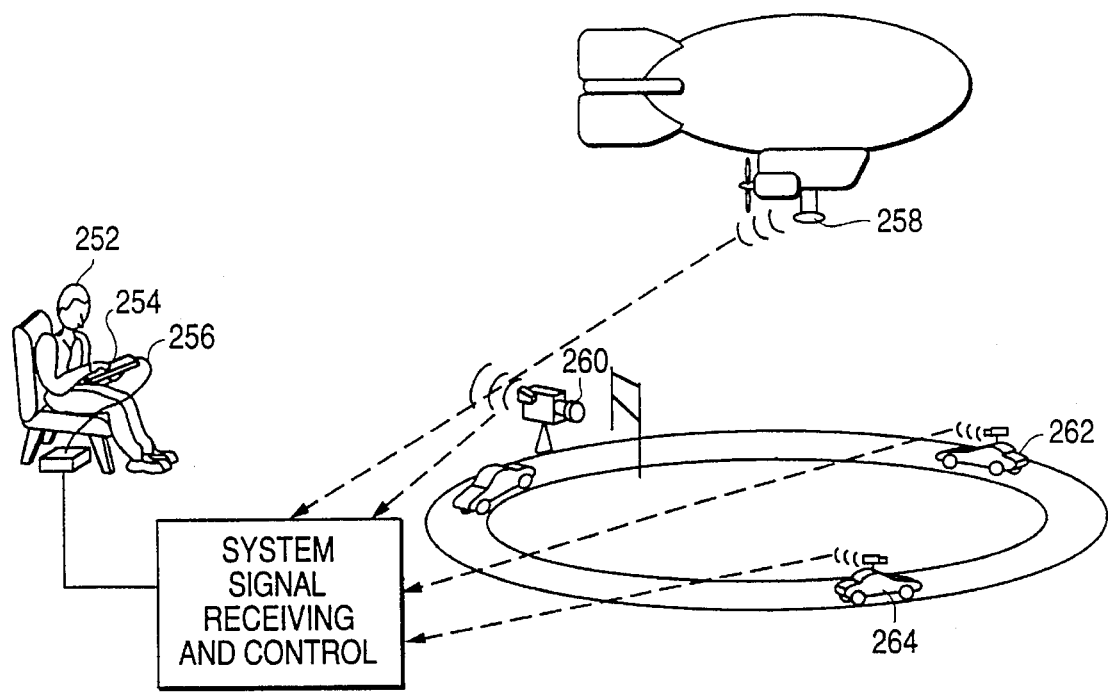
FIG. 9 is a representation of a video recording system according to a second embodiment of the invention.

A second embodiment of the invention utilizes real time "editing" of various perspectives/views of a particular event. For example, as depicted in FIG. 9, a user 252 is provided with a modified recording device 254, such as a modified Video Walkman® VCR, which is connected by wire to camera feeds. Preferably, this connection utilizes a cable 256 with specially adapted terminals to prevent unauthorized use. Alternatively, access can be limited to authorize uses by restricting access to particular locations, thereby eliminating the need for special terminals.

Figure 10:
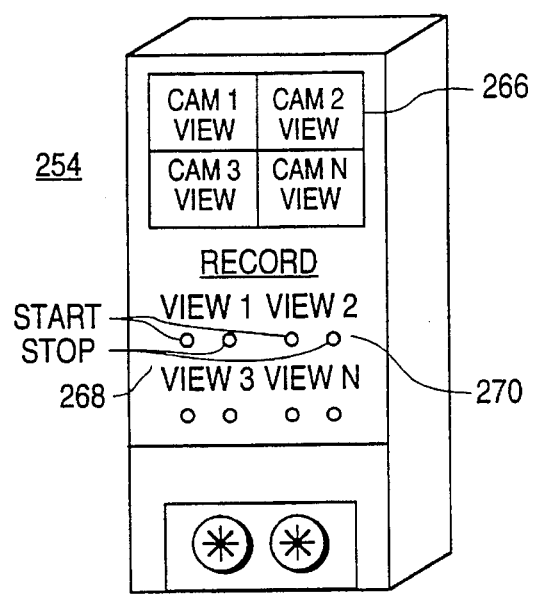
FIG. 10 is a more detailed representation of a modified user controlled, portable recorder for use in the system of FIG. 9.

Using the modified Video Walkman® 254, the user can select which camera feeds 258, 260, 262, 264 are to be recorded as video signals from the camera feeds are received and monitored. The user monitors each view with a split screen or picture within picture ("PIP") effect. Various techniques for implementing a super imposed or PIP effect are known and include those described in U.S. Pat. Nos. 4,746,983, 4,862,269, 4,620,229 and 4,821,102, the disclosures of which are hereby incorporated by reference. FIG. 10 depicts such a modified Video Walkman® VCR 254 having a split screen 266 and record start buttons 268 and record stop buttons 270 for each of four views. For example, if the record start button 268 for view 1 is selected, the signal fed from a camera providing view 1 would be supplied to the VCR and recorded there. If stop is depressed, the recording operation will be interrupted.

The system shown in FIG. 9 could be used to record an event such as the Indianapolis 500. According to this example, the user sits in the stands or at a remote site with a Video Walkman® VCR modified to display various views, and thereby monitors various camera perspectives in real time. For example, one camera view showing a blimp view 258 (overhead of track camera) might be displayed on one area of the monitor. Another camera 262 providing a particular driver's view might be shown on another area. Other cameras might similarly provide other drivers' views 264. Still another camera 260 might provide a view of the finish line at ground level. The user 252 would monitor a split screen display of all these views and choose via the record control panel which view to record. This permits the user to change instantaneously which view is being recorded. The end result is a customized version of an event on a user's topic with views not available if the user had just used his own camera/camcorder equipment from a normal spectators' perspective.

Alternatively, real-time editing can be accomplished using another control device in place of the Modified Video Walkman® VCR described above. For example, the user could observe the various camera views on a plurality of monitors located at the event venue. Such monitors might be arranged in a special "box" section in which the user can view both the monitoring and the event. The viewer could be provided with a wireless remote control box which has start record and stop record buttons provided thereon which correspond to each displayed view. By operating these buttons, the user could select the view to be recorded at a central location at the event venue.

A similar variation for this embodiment could utilize a control panel incorporated in an arm rest of the user's seat or in the back portion of the seat in front of the user. The control panel would include the record start and record stop buttons for each view as described above. Access to such seats could be limited to particular sections of the venue. A central recording station would then have a plurality of recorders coupled to each set. The user could purchase the tape corresponding to the seat from which the record control commands were received.

Figure 11:
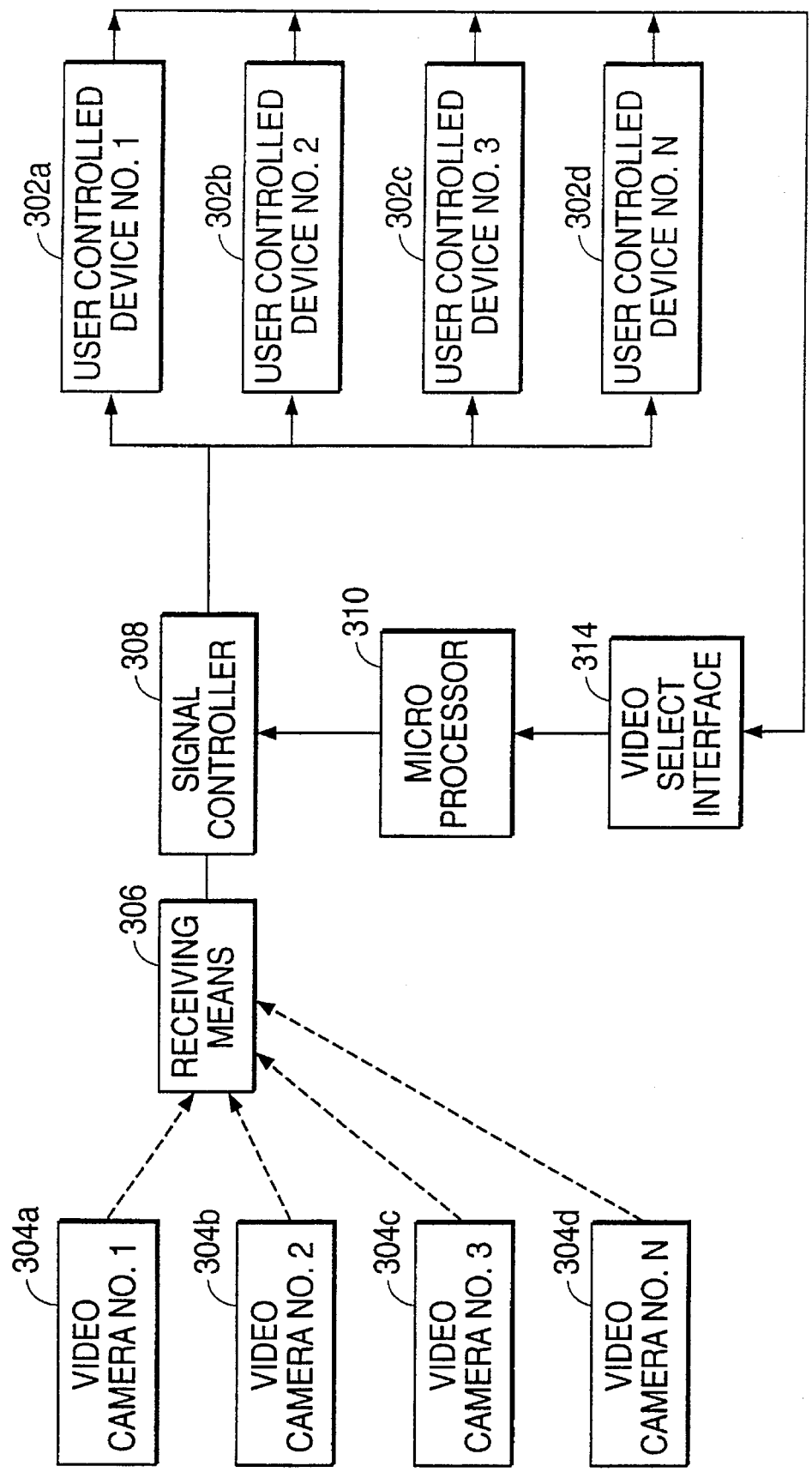
FIG. 11 is a block diagram illustrating a video system viewstation according to the second embodiment of the invention.

FIG. 11 is a block diagram which illustrates such a system according to the second embodiment of the invention. According to this example, n users employ n modified VCRs 302a to 302d such as mentioned above. Each such device 302a to 302d is coupled via a video select interface 314 to a microprocessor 310. The microprocessor 310 controls the output from a signal controller 308 which is coupled to a broadcast receiver 306. The receiver 306 receives an over-air broadcast video signal from each of n cameras 304a to 304d. In this way, the user can select which video signal from n cameras 304a to 304d is to be provided to a particular VCR. While in the example shown, each VCR is connected via wire, the system could be modified to utilize wireless transmission between the user controlled devices and the system.

As mentioned above, an alternative embodiment of the invention employs a central recording "station" where all camera views are recorded at a central "location" similar to that depicted in FIG. 2. According to this variation, each camera view is recorded at a central station. The various recorded signals are displayed as described above on a plurality of monitors. The user then accesses the system and selects which of the views to record. Such access is preferably limited by use of specialized plugs or by restricting access to the recording station, for example by locating it at a restricted section or box at the venue.

Figure 12:
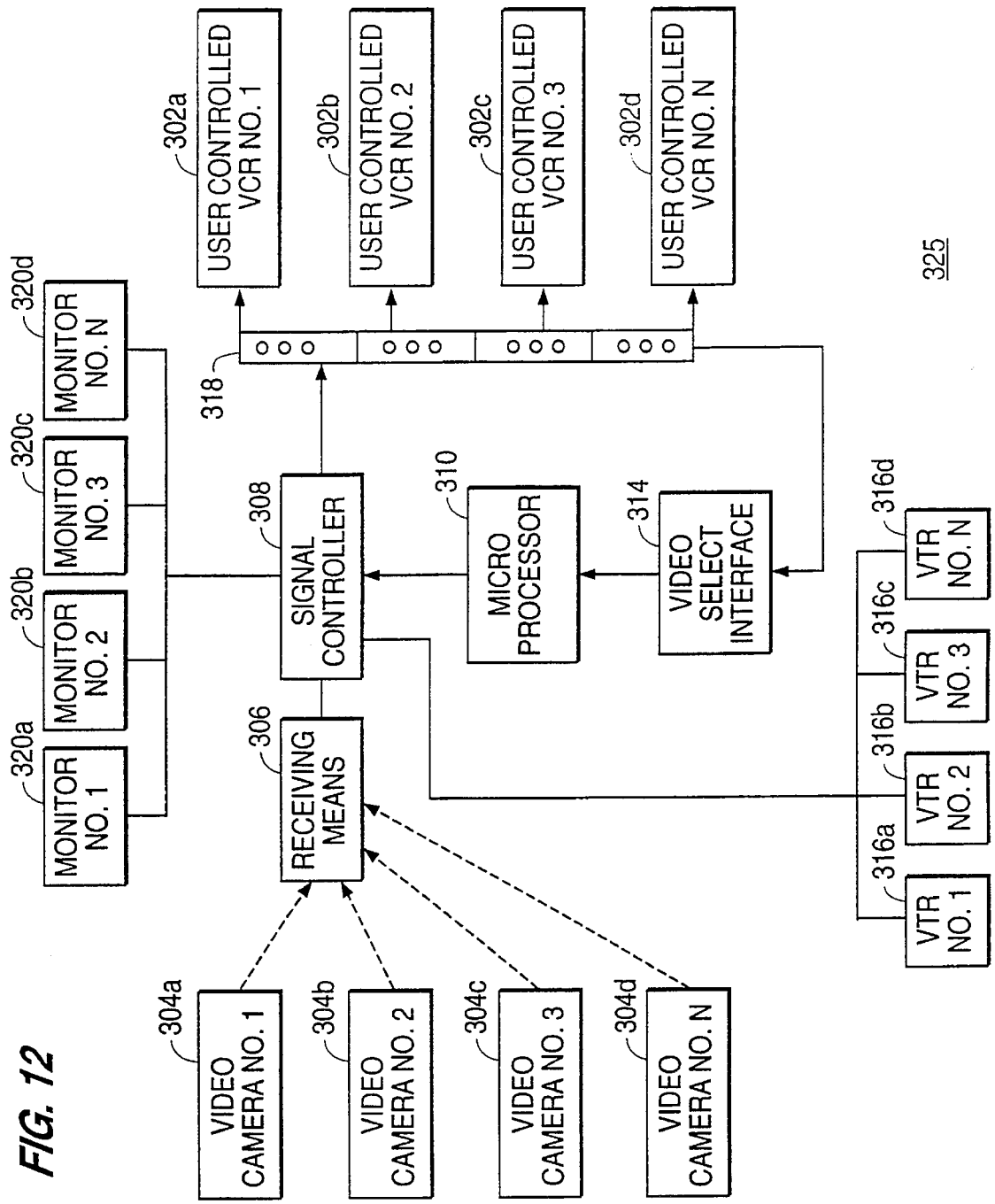
FIG. 12 is a block diagram showing a central viewstation according to an alternative embodiment of the invention.

FIG. 12 illustrates such a system 325. As in the previously described systems, video signals are provided to a signal controller 308 via a broadcast receiving means 306. The signal controller 308 determines the images supplied to a plurality of video terminals 318 located at the central viewstation. Along with These terminals 318 are a plurality of n monitors 320a to 320d. These monitors 320a to 320d display live images from the video cameras 304a to 304d. The user selects which of the images viewed on the monitors is to be recorded on one of the n video tape recorders 316a to 316d coupled to the video cameras 304a to 304d through the controller 308, whereupon signals indicative of the selection are provided to a microprocessor 310 via an interface 314. The microprocessor 310 controls the signal controller 308 based on this selection. As a result, selected views are provided to the N VTRs designated for control by one of the control devices 302. Again, the control device might be a remote control or a control panel located on or near a particular seat. Alternatively, the control device might be a Modified Video Walkman® described above.

Using such a system, the user could also go to the "studio" station subsequent to an event and review recorded views—editing portions of each "master" tape onto personalized copy. For example, instead of each VTR 1 to N being designated for recording only the images indicated by the user during the event, some VTRs could be used to record each view from cameras 1 to N. The user could then edit the user's own recording to include recorded portions from other camera feeds. For example, the first fifteen minutes of the edited copy user's recording might consist of the view from camera one. Then the user might insert five minutes from camera 2, ten minutes again from camera 1, then the view from camera 3 when a crash occurred, and so forth. Regardless of whether a location in which centrally located monitors are used or a system such as shown in FIG. 10 is used, either alternative preferably includes means (such as the specialized jacks or the restricted locations mentioned above) for limiting access in order to generate revenue for access charges to users, charges for end product (customized tape), etc.

An advantage of the invention is that it can be implemented using existing technology and available equipment in a way which presents few construction difficulties.

In view of the above, it is apparent that in accordance with the present invention, an apparatus that fully satisfies the objectives, aims and advantages thereof is described. It would be appreciated that while the invention has been described in the context of specific embodiments, many alternatives, modifications, permutations and variations thereon will become apparent to those skilled in the art in light of the foregoing descriptions.

Accordingly, it is intended that the present invention embrace all such alternatives, modifications and variations as falling within the scope of the appended claims.

What is claimed is:

1. An event viewing and recording system comprising:

a plurality of video cameras positioned at predetermined locations at a predefined event occurrence area for capturing video images of activities occurring within a predetermined view of said event occurrence area and providing a video signal thereof;

control means for providing video selection signals indicating which of the video signals is desired to be viewed;

means for selectively routing video signals from said plurality of video cameras based on said video selection signals; and a securing unit having at least one compartment for holding video recording equipment, said compartment including video terminals for providing the video signal routed by said means for selectively routing based on said video selection signals.

2. The system as set forth in claim 1, wherein said control means is provided within said compartment.

3. The system as set forth in claim 1 wherein said control means further includes a transmitting device for relaying a record start and a record stop signal to one of said plurality of video cameras.

4. The system as set forth in claim 1 wherein said control means comprises a remote control unit which wirelessly provides said video selection signals to said means for selectively routing video signals.

5. The system as set forth in claim 4 further comprising a transmitting device coupled to said means for selectively routing video signals which is located in said at least one compartment, said remote control unit selectively providing a record start signal and a record stop signal to one of said plurality of video cameras in said at least one compartment via said means for selectively routing video signals.

6. The system as set forth in claim 1 wherein said compartment is provided with a lockable cover.

7. The system as set forth in claim 6 wherein said cover includes a money receiving portion which, upon deposition of a predetermined amount of money opens a lock that prevents access to said compartment.

8. The system as set forth in claim 6 wherein said control means includes means for wirelessly controlling access to said compartment.

9. An event viewing and recording system comprising:

a plurality of video cameras positioned at predetermined locations at a predefined event occurrence area for capturing video images of activities occurring within a predetermined view of said event occurrence area and providing a video signal thereof;

means for selecting which of said video signals the user desires to view and providing video selection signals indicative thereof;

interface means for receiving said video selection signals;

at least one user controlled video recording unit; and means, coupled with said interface means, for selectively routing video signals from said plurality of video cameras to said at least one video recording unit based on said video selection signals.

10. An event viewing and recording system according to claim 9, wherein said at least one user controlled video recording unit includes a plurality of user controlled video recording units.

11. An event viewing and recording system according to claim 9, wherein the video signal of each said video camera is broadcast to receiving means coupled to said means for selectively routing video signals.

12. An event viewing and recording system according to claim 9, wherein said user controlled video recording unit includes a video monitor for monitoring said video signals.

13. An event viewing and recording system according to claim 12, wherein said video monitor displays a split view of two or more images from said plurality of video cameras.

14. An event viewing and recording system according to claim 13, wherein said selecting means includes a plurality of operating members for selectively initiating or terminating recording of one of said images from said plurality of video cameras, whereby the user can selectively record one of the images displayed on said monitor.

15. An event viewing and recording system comprising:

a plurality of video cameras positioned at desired locations at a predefined event occurrence area for capturing video images of activities occurring within a predetermined view of said event occurrence area;

a plurality of video recorders, each of said video recorders recording a captured image based on a video signal supplied from a corresponding one of said plurality of video cameras;

a plurality of video monitors positioned at a central observation viewstation, each of said video monitors selectively displaying an image from one of said plurality of video cameras or from one of said plurality of video recorders;

control means for selectively routing video signals based on said video images to said at least one video output terminal; and at least one user controlled device coupled to said control means for selecting the video signal to be provided to said video output terminal based on the images displayed on said video monitors.

16. The event viewing and recording system of claim 15, wherein said user controlled device comprises a control unit having a plurality of operating members for selectively initiating or terminating recording of one of said images from said plurality of video cameras.

17. The event viewing and recording system of claim 15, wherein said user control device is provided at or near a seat located at an event venue.

\* \* \* \* \*